(12) United States Patent
Koerner et al.

(10) Patent No.: US 12,290,859 B2
(45) Date of Patent: May 6, 2025

(54) POWDER APPLICATION DEVICE, METHOD FOR OPERATING A POWDER APPLICATION DEVICE, AND SYSTEM FOR PRODUCING A THREE-DIMENSIONAL WORKPIECE

(71) Applicant: Nikon SLM Solutions AG, Luebeck (DE)

(72) Inventors: Peter Koerner, Luebeck (DE); Ralf Frank, Luebeck (DE)

(73) Assignee: Nikon SLM Solutions AG, Luebeck (DE)

( * ) Notice: Subject to any disclaimer, the term of this patent is extended or adjusted under 35 U.S.C. 154(b) by 867 days.

(21) Appl. No.: 17/292,614

(22) PCT Filed: Nov. 6, 2019

(86) PCT No.: PCT/EP2019/080384
§ 371 (c)(1),
(2) Date: May 10, 2021

(87) PCT Pub. No.: WO2020/099211
PCT Pub. Date: May 22, 2020

(65) Prior Publication Data
US 2022/0009000 A1 Jan. 13, 2022

(30) Foreign Application Priority Data
Nov. 12, 2018 (DE) .................. 10 2018 128 242.7

(51) Int. Cl.
*B22F 12/60* (2021.01)
*B22F 10/28* (2021.01)
(Continued)

(52) U.S. Cl.
CPC .............. *B22F 12/60* (2021.01); *B22F 10/73* (2021.01); *B22F 12/50* (2021.01); *B22F 12/67* (2021.01);
(Continued)

(58) Field of Classification Search
CPC .......... B22F 12/60; B22F 10/73; B22F 12/50; B22F 12/67; B22F 10/28; B22F 10/32;
(Continued)

(56) References Cited

U.S. PATENT DOCUMENTS

2017/0239724 A1* 8/2017 Diaz ...................... B33Y 50/02
2018/0194126 A1 7/2018 Hagedorn et al.
(Continued)

FOREIGN PATENT DOCUMENTS

CN 105562687 A * 5/2016
CN 106392069 2/2017
(Continued)

OTHER PUBLICATIONS

CN-108367352-A; Nicaise et al., machine translation. (Year: 2018).*
(Continued)

*Primary Examiner* — John A Hevey
(74) *Attorney, Agent, or Firm* — Williams Mullen; Thomas F. Bergert, Esq

(57) ABSTRACT

A powder application device (10) for use in a system (100) for producing a three-dimensional workpiece using a generative layering process comprises a spreading member (12). The spreading member (12) is movable across a surface of a carrier (116) for depositing a raw material powder for producing a workpiece by a generative layering method onto the surface of the carrier (116). Furthermore, the powder application device (10) comprises a powder entrainer (16) which is movable across a carrier plane (E) and which, in the region of a surface (20) facing the carrier plane (E), is (Continued)

Figure 1:
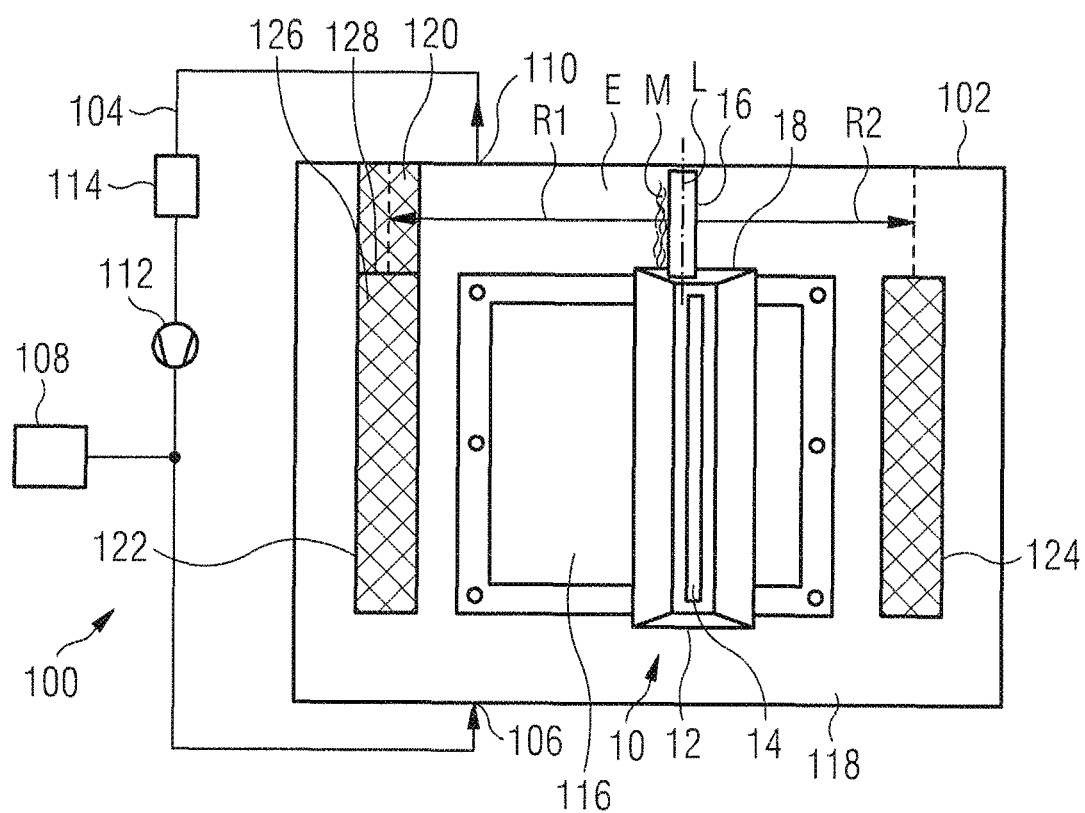

provided with a surface profile (22). The surface profile (20) comprises an entraining element (24a, 24b, 24c) and a passage channel (26a, 26b, 26c). The entraining element (24a, 24b, 24c) and the passage channel (26a, 26b, 26c) are shaped and arranged in such a way that, with respect to the movement of the powder entrainer (16) across the carrier plane (E), powdery material deposited in front of the powder entrainer (16) on the carrier plane (E) is entrained by the entraining element (24a, 24b, 24c) during a movement of the powder entrainer (16) across the carrier plane (E) in a first direction of movement (R1), and is guided through the passage channel (26a, 26b, 26c) during a movement of the powder entrainer (16) across the carrier plane (E) in a second direction of movement (R2) opposite to the first direction of movement (R1).

15 Claims, 2 Drawing Sheets

(51) Int. Cl.
| | | |
|---|---|---|
| B22F 10/32 | (2021.01) | |
| B22F 10/73 | (2021.01) | |
| B22F 10/77 | (2021.01) | |
| B22F 12/50 | (2021.01) | |
| B22F 12/67 | (2021.01) | |
| B22F 12/70 | (2021.01) | |
| B28B 1/00 | (2006.01) | |
| B33Y 10/00 | (2015.01) | |
| B33Y 30/00 | (2015.01) | |
| B33Y 40/00 | (2020.01) | |

(52) U.S. Cl.
CPC ............... *B28B 1/001* (2013.01); *B33Y 10/00* (2014.12); *B33Y 30/00* (2014.12); *B33Y 40/00* (2014.12); *B22F 10/28* (2021.01); *B22F 10/32* (2021.01); *B22F 10/77* (2021.01); *B22F 12/70* (2021.01)

(58) Field of Classification Search
CPC .......... B22F 10/77; B22F 12/70; B28B 1/001; B33Y 10/00; B33Y 30/00; B33Y 40/00; Y02P 10/25; B29C 64/214
See application file for complete search history.

(56) References Cited

U.S. PATENT DOCUMENTS

| | | | |
|---|---|---|---|
| 2020/0269510 A1 | | 8/2020 | Nicaise et al. |
| 2021/0023793 A1* | | 1/2021 | Löfving ................ B29C 64/268 |

FOREIGN PATENT DOCUMENTS

| | | | | |
|---|---|---|---|---|
| CN | 107042304 | | 8/2017 | |
| CN | 107303608 | | 10/2017 | |
| CN | 107433714 A | * | 12/2017 | |
| CN | 107835737 X | | 3/2018 | |
| CN | 108367352 A | * | 8/2018 | ............. B22F 10/10 |
| CN | 108480639 A | * | 9/2018 | ............. B22F 10/00 |
| CN | 108544753 A | * | 9/2018 | ........... B29C 64/153 |
| DE | 602005001972 | | 12/2007 | |
| DE | 102012200161 | | 7/2013 | |
| DE | 102012200161 A1 | * | 7/2013 | ............. B22F 3/003 |
| DE | 102016211799 | | 1/2018 | |
| EP | 2961549 | | 9/2014 | |
| EP | 2818305 | | 12/2014 | |
| EP | 2862651 | | 4/2015 | |
| EP | 2878402 | | 6/2015 | |
| EP | 3068929 | | 8/2015 | |
| EP | 3391981 | | 10/2018 | |
| WO | 2018029059 | | 2/2018 | |

OTHER PUBLICATIONS

CN-107433714-A, machine translation. (Year: 2017).*
CN-105562687-A, Zhang et al., machine translation (Year: 2016).*
German Office Action, German Patent and Trademark Office, for Application No. 10 2018 128 242.7, Jul. 31, 2019.
European Patent Office, International Search Report and Written Opinion for International Application No. PCT/EP2019/080384, Jan. 7, 2020.
China National Intellectual Property Administration, Chinese Office Action for CN Patent Application No. 201980081109.3, Aug. 29, 2022.

* cited by examiner

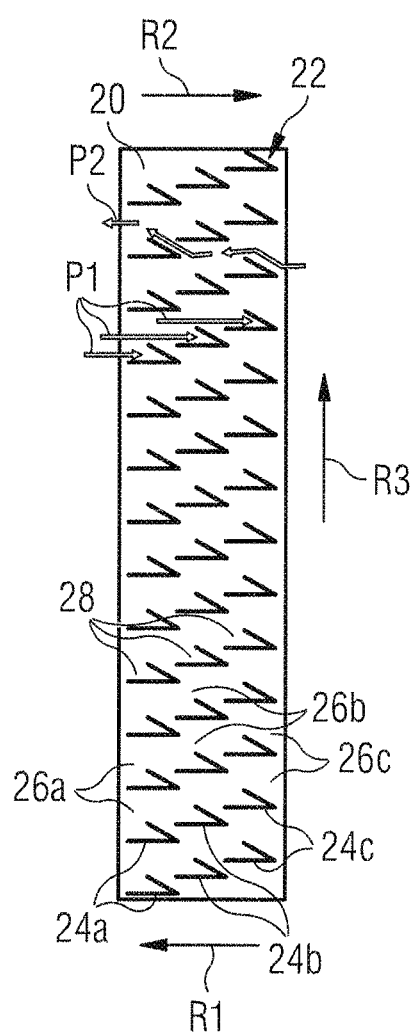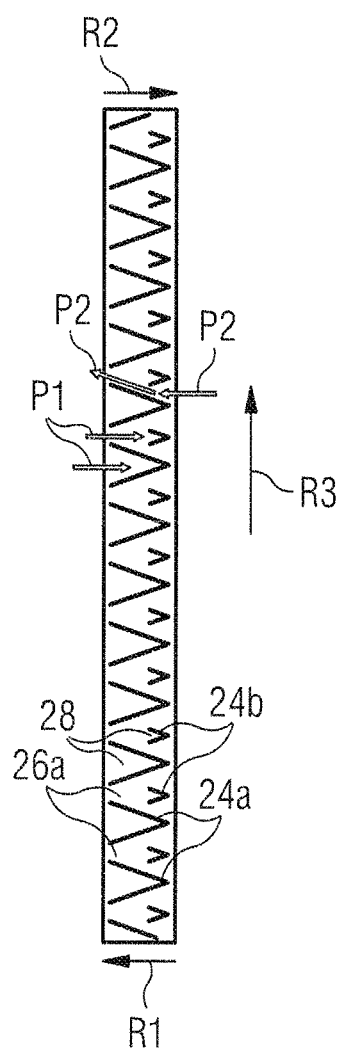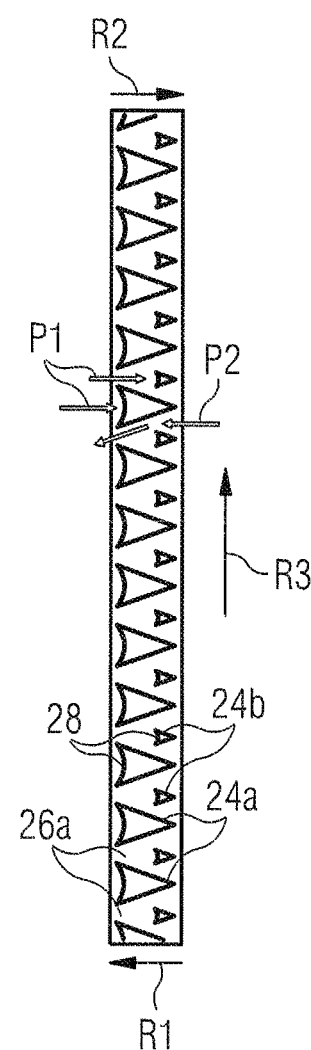

POWDER APPLICATION DEVICE, METHOD FOR OPERATING A POWDER APPLICATION DEVICE, AND SYSTEM FOR PRODUCING A THREE-DIMENSIONAL WORKPIECE

CROSS-REFERENCE TO RELATED APPLICATIONS

This application is the U.S. national phase of international application PCT/EP2019/080384, filed on Nov. 6, 2019, which claims the benefit of European application DE 10 2018 128 242.7 filed on Nov. 12, 2018; all of which are hereby incorporated herein in their entirety by reference.

The invention relates to a powder application device for use in a system for producing a three-dimensional workpiece using a generative layering process. Furthermore, the invention relates to a method of operating such a powder application device. Finally, the invention relates to a system equipped with such a powder application device for producing a three-dimensional workpiece using a generative layering process.

In generative processes for the production of three-dimensional workpieces and in particular in generative layering processes, it is known to apply a raw material powder layer by layer to a carrier and to solidify it by site-specific irradiation, e.g. by melt fusing or sintering, in order to ultimately obtain a workpiece of a desired shape. The irradiation can be carried out by means of electromagnetic radiation, in particular laser radiation, or particle radiation. Once a workpiece layer has been solidified, a new layer of unprocessed raw material powder is applied onto the already produced workpiece layer. Known coater arrangements or powder application devices can be used for this purpose. Subsequently, the now uppermost and still unprocessed raw material powder layer is irradiated. Consequently, the workpiece is built up successively layer by layer, each layer defining a cross-sectional area and/or a contour of the workpiece. In this context, it is also known to make use of CAD or comparable workpiece data to manufacture the workpieces essentially automatically.

Known devices for the production of three-dimensional workpieces can be found, for example, in EP 2 961 549 A1 and EP 2 878 402 A1. The devices described in these documents each comprise a carrier which can be lowered vertically downwards layer by layer. A corresponding vertical movement of the carrier always takes place in these known devices when a layer of the raw material powder has been completely irradiated and before the next powder layer is applied. Thus, it can be ensured that a focal plane of the irradiation unit is always located in the layer to be solidified (i.e., in the uppermost layer) of the raw material powder. Furthermore, these devices comprise a process chamber connected to a gas circuit. A gas, in particular an inert gas, can be supplied to the process chamber via a gas inlet. After flowing through the process chamber, the gas is discharged from the process chamber via a gas outlet.

A powder application device is usually used to apply the raw material powder onto the carrier. The powder application device comprises a spreading member movable across the surface of the carrier, which moves across the surface of the carrier or a powder layer that has already been applied onto the surface of the carrier and has at least partially solidified, thereby applying a new powder layer. The spreading element may comprise a roller, pusher or other component suitable for applying and spreading the raw material powder onto the carrier. The powder to be applied may be taken from a powder reservoir formed integrally with the spreading member of the powder application device, which is movable across the surface of the carrier.

Alternatively, however, the powder application device may comprise a stationary powder reservoir, for example located adjacent to the carrier, from which the spreading member movable across the carrier takes powder and distributes it across the surface of the carrier. Powder application devices suitable for use in a system for producing a three-dimensional workpiece using a generative layering process are described, for example, in EP 2 818 305 B1 or WO 2018/029059 A1.

CN 107 303 608 A discloses a powder application device for a generative layering process. A new planar powder layer is created by moving a powder speader in a direction parallel to the new powder layer to be created, and distributing powder accumulated in webs for the new powder layer. For this purpose, the powder spreader is formed with tines on a front side similar to a comb, and a tine divides an upper part of a web with accumulated powder, so that the powder for the new layer is displaced in furrows between the webs, thus creating a flat powder layer. Excess material of a web with accumulated powder, which cannot be taken up in the furrows, is transported away on an upper side of the powder spreader.

It is the object of the invention to provide a powder application device which is suitable for use in a system for producing a three-dimensional workpiece using a generative layering process and which facilitates the efficient production of high-quality workpieces. Furthermore, the invention is directed to the object of providing a method for operating a powder application device which is suitable for use in a system for producing a three-dimensional workpiece using a generative layering process and which facilitates efficient production of high-quality workpieces. Finally, the invention is directed to the object of providing a system equipped with such a powder application device for the production of a three-dimensional workpiece by means of a generative layering process.

This object is solved by a powder application device with the features of claim 1, a method of operating a powder application device with the features of claim 11, and a system for producing a three-dimensional workpiece with the features of claim 13.

A powder application device for use in a system for producing a three-dimensional workpiece by means of a generative layering process comprises a spreading member movable across a surface of a carrier for depositing a raw material powder for producing a workpiece by a generative layering process onto the surface of the carrier. The carrier may have a horizontal surface onto which the raw material powder may be applied in layers, i.e., horizontal layers. Furthermore, the carrier may be arranged to be lowered down in a vertical direction layer by layer.

A powder reservoir can be integrally formed with the spreading member of the powder application device, which is movable across the surface of the carrier, and can also move across the surface of the carrier during operation of the powder application device. By appropriately controlling the discharge of powder from the powder reservoir, a desired amount of raw material powder can then be applied to the carrier during movement of the spreading member across the surface of the carrier. Alternatively, however, the powder application device may also comprise a stationary powder reservoir, which is arranged adjacent to the carrier, for example, and from which the spreading member of the powder application device takes powder and distributes it across the surface of the carrier.

The raw material powder to be applied to the carrier may be, for example, a metallic or ceramic raw material powder. The raw material powder may have different particle sizes and particle size distributions depending on the desired properties of the workpiece to be produced. Preferably, however, the particle size of the raw material powder is less than 100 μm.

Furthermore, the powder application device comprises a powder entrainer movable across a carrier plane. The carrier plane is a plane which extends parallel to the surface of the carrier and, at least in certain operating states of the carrier, for example when the carrier is in its maximum raised position, may also be coplanar with the surface of the carrier and defined at least in part by the surface of the carrier. Additionally or alternatively, the carrier plane may be defined by a region of a bottom plate of a process chamber of the system for producing a workpiece by a generative layering process, which region is arranged adjacent to the carrier.

In the region of a surface facing the carrier plane, the powder entrainer is provided with a surface profile comprising an entraining element and a passage channel. The entraining element and the passage channel are shaped and arranged in such a way that, with respect to the movement of the powder entrainer across the carrier plane, powdery material deposited in front of the powder entrainer on the carrier plane is entrained by the entraining element during a movement of the powder entrainer across the carrier plane in a first direction of movement. On the other hand, during a movement of the powder entrainer across the carrier plane in a second direction of movement opposite to the first direction of movement, the powdery material deposited on the carrier plane is guided through the passage channel.

The powder entrainer is thus capable of entraining powdery material that, with respect to the movement of the powder entrainer across the carrier plane, is deposited on the carrier plane in front of the powder entrainer, and of pushing it across the carrier plane when it moves across the surface of the carrier in the first direction of movement. In contrast, powdery material that, with respect to the movement of the powder entrainer across the carrier plane, is deposited in front of the powder entrainer on the carrier plane remains substantially in its original position when the powder entrainer moves across the surface of the carrier in the second direction of movement. The powder entrainer can thus be used to remove powdery material that accumulates on the carrier plane in an area of the carrier plane out of that area by moving the powder entrainer in the first direction of movement. At the same time, the powder entrainer is prevented from transporting powdery material into this area of the carrier plane during a displacement in the second direction of movement.

During operation of a system for producing a three-dimensional workpiece by a generative layering process, powder and/or condensate, which is carried along by a gas flow through the process chamber, can be deposited in an area of the carrier plane adjacent to a gas outlet of the process chamber. This powder and/or condensate can be transported away from said area of the carrier plane by means of the powder entrainer by a movement of the powder entrainer in the first direction of movement, and conveyed, for example, into a collecting chamber. At the same time, the design of the surface profile of the powder entrainer prevents powder and/or condensate particles from being transported in an undesirable manner into the area of the carrier plane adjacent to the gas outlet when the powder entrainer is moved in the second direction of movement.

This prevents the gas flow through the gas outlet from being impeded by the accumulation of powder and/or condensate on the carrier plane in the area of the gas outlet. It also minimizes contamination of the gas stream exiting the process chamber via the gas outlet by powder and/or condensate particles accumulated in the area of the gas outlet. A gas filter, which is arranged in a gas discharge line connected to the gas outlet and serves to filter particulate impurities from the gas stream flowing through the gas discharge line, is thus protected from premature clogging. The powder application device consequently facilitates the efficient production of a high-quality three-dimensional workpiece by means of a generative layering process.

In principle, the spreading member and the powder entrainer may be designed separately from each other and may be moved separately and independently of each other across the surface of the carrier or the carrier plane. Preferably, however, the powder entrainer is attached to the spreading member and is thus moved together with the spreading member during operation of the powder application device. For example, the powder entrainer may extend from a side surface of the spreading member in a direction substantially perpendicular to the first and the second direction of movement of the powder entrainer across the carrier plane. During the joint movement of the spreading member and the powder entrainer, the powder entrainer then sweeps across an area of the carrier plane that is adjacent to the carrier in the direction substantially perpendicular to the first and the second direction of movement of the powder entrainer across the carrier plane.

The surface profile may comprise a plurality of entraining elements and a plurality of passage channels arranged between the entraining elements. Alternatively, an entraining element may be designed to define a plurality of passage channels by its shape. At least a part of the entraining elements of the surface profile provided on the powder entrainer may be designed to be tapered in the region of a, with respect to the movement of the powder entrainer across the carrier plane in the second direction of movement, front end. By "tapered" can be understood here also a design of the ends of the entraining elements with a minimum radius. Such a design of the entraining elements ensures that powdery material, which, with respect to the movement of the powder entrainer across the carrier plane in the second direction of movement, is deposited on the carrier plane in front of the powder entrainer, is guided past the entraining elements into the passage channels present between the entraining elements. It is understood that the tapered end of the entraining elements forms a rear end of the entraining elements when the powder entrainer moves across the carrier plane in the first direction of movement.

In contrast, at least a part of the entraining elements may be provided with a powder collecting section in the region of a, with respect to the movement of the powder entrainer across the carrier plane in the first direction of move, front end. As a result, powdery material which, with respect to the movement of the powder entrainer across the carrier plane in the first direction of movement, is deposited on the carrier plane in front of the powder entrainer, is caught and carried along by the entraining elements. It is understood that the end of the entraining elements provided with a powder collecting section forms a rear end of the entraining elements when the powder entrainer moves across the carrier plane in the second direction of movement.

At least a part of the entraining elements may be V-shaped, wedge-shaped and/or hook-shaped. The entraining elements are then oriented in particular in such a way that their tapered end forms a, with respect to the direction of movement of the powder entrainer across the carrier plane, front end when the powder entrainer is moved across the carrier plane in the second direction of movement. This ensures, as described above, that when the powder entrainer is moved across the carrier plane in the second direction of movement, powdery material deposited on the carrier plane is directed, starting from the tapered ends of the entraining elements and along outer surfaces of the entraining elements, into the passageways provided between the entraining elements. A passage cross-section of the passage channels bounded by the outer surfaces of the entraining elements preferably decreases in the second direction of movement of the powder entrainer across the carrier plane. In a particularly simple design form, at least a part of the entraining elements is formed in the form of a straight line.

At the same time, the entraining elements are oriented in particular in such a way that their end provided with a powder collecting section forms a, with respect to the direction of movement of the powder entrainer across the carrier plane, front end, when the powder entrainer is moved in the first direction of movement across the carrier plane. In this way, as described above, it is achieved that powdery material deposited on the carrier plane is caught and carried along by the powder collecting sections of the entraining elements when the powder entrainer is moved across the carrier plane in the first direction of movement.

In a preferred embodiment of the powder application device, the surface profile of the powder entrainer comprises a first group of entraining elements, which are arranged in a row next to one another in the direction substantially perpendicular to the first and the second direction of movement of the powder entrainer across the carrier plane. Preferably, a passage channel is present between mutually adjacent entraining elements of the first group. The distance between mutually adjacent entraining elements of the first group then determines the dimensions of the passage channels defined between the entraining elements and can be selected, for example, in depedence on the particle size, the particle size distribution and the agglomeration tendency of the powder particles deposited on the carrier plane and, in dependence of the direction of movement of the powder entrainer across the carrier plane, either to be entrained or to be guided through the passage channels and possibly influenced by the process in the process chamber. The height of the entraining elements can be selected as required. For example, the entraining elements can be designed higher, in order to be able to entrain more powder, if the powder entrainer is moved more rarely, e.g. independently of the spreading member across the carrier plane.

Furthermore, the surface profile of the powder entrainer may comprise a second group of entraining elements which are arranged in a row next to one another in the direction substantially perpendicular to the first and the second direction of movement of the powder entrainer across the carrier plane. In addition, the entraining elements of the second group are preferably arranged, with respect to the first direction of movement of the powder entrainer across the carrier plane, behind the first group of entraining elements and at least partially in the passage channels present between the entraining elements of the first group. During a movement of the powder entrainer across the carrier plane in the first direction of movement, the entraining elements of the first group then first encounter the powdery material deposited on the carrier plane. A part of the powdery material is then already caught and carried along by the entraining elements of the first group, i.e. in particular their powder collecting sections. On the other hand, powdery material which initially enters the passage channels between the entraining elements of the first group meets the entraining elements of the second group in the further course of the movement of the powder entrainer across the carrier plane in the first direction of movement.

The entraining elements of the second group are preferably shaped and arranged in such a way that they capture and entrain powdery material entering the passage channels between the entraining elements of the first group, when the powder entrainer moves across the carrier plane in the first direction of movement. The entraining elements of the second group, i.e. in particular their powder collecting sections, then capture the powdery material not entrained by the entraining elements of the first group. This ensures that powdery material deposited on the carrier plane is carried along, at least to a large extent, during a movement of the powder entrainer across the carrier plane in the first direction of movement.

Further, the entraining elements of the second group are preferably shaped and arranged to direct powdery material entering the passageways upon movement of the powder entrainer across the carrier plane in the second direction of movement through the passageways. In other words, the entraining elements of the second group are preferably shaped and arranged in such a way that they do not close off the passage channels, but rather allow powdery material to pass through the passage channels when the powder entrainer moves across the carrier plane in the second direction of movement.

With respect to the second direction of movement of the powder entrainer across the carrier plane, the entraining elements of the second group may be arranged in front of the entraining elements of the first group. During a movement of the powder entrainer across the carrier plane in the second direction of movement, the entraining elements of the second group then encounter the material deposited on the carrier plane before the entraining elements of the first group.

Alternatively, however, it is also possible to design the surface profile of the powder entrainer in such a way that the entraining elements of the second group, with respect to the second direction of movement of the powder entrainer across the carrier plane, are arranged at the same level as the entraining elements of the first group. In this case, when the powder entrainer moves across the carrier plane in the second direction of movement, the entraining elements of the first and second groups then simultaneously encounter the powdery material deposited on the carrier plane, so that the powdery material is guided past the entraining elements of the second group through the passage channels provided between the entraining elements of the first group.

In a preferred embodiment of the powder application device, the entraining elements of the second group, in the direction essentially perpendicular to the first and the second direction of movement of the powder entrainer across the carrier plane, are arranged offset to the entraining elements of the first group. For example, in particular, entraining elements of the second group, which are arranged behind the entraining elements of the first group not only with respect to the first direction of movement of the powder entrainer across the carrier plane, but also with respect to the second direction of movement of the powder entrainer across the carrier plane, can be arranged offset relative to the entraining elements of the first group in the direction essentially perpendicular to the first and the second direction of movement in such a way that an entraining element of the second group is arranged in each passage channel present between two entraining elements of the first group.

Furthermore, the surface profile of the powder entrainer may comprise a third group of entraining elements. The entraining elements of the third group may be arranged in a row next to on another in the direction substantially perpendicular to the first and the second direction of movement of the powder entrainer across the carrier plane. Additionally or alternatively, the third group of entraining elements, in the direction substantially perpendicular to the first and the second direction of movement, may be arranged offset relative to the first and/or the second group of entraining elements. The entraining elements of the third group, with respect to the first direction of movement of the powder entrainer across the carrier plane, may be arranged behind the second group of entraining elements at least partially in passage channels present between the entraining elements of the second group. The entraining elements of the third group then fulfill the same functions with respect to the entraining elements of the second group as described above for the entraining elements of the second group with respect to the entraining elements of the first group. If desired or necessary, the surface profile of the powder entrainment system may also comprise other groups of entraining elements, for example, depending on its surface area.

The entraining elements of the first group, the entraining elements of the second group, and/or the entraining elements of the third group may be substantially identically shaped. For example, all the entraining elements can be substantially hook-shaped and/or of the same size. The entraining elements of the second group then preferably protrude only partially into the passage channels present between the entraining elements of the first group, while the entraining elements of the third group then similarly preferably protrude only partially into the passage channels present between the entraining elements of the second group.

In an alternative embodiment of the powder application device, the entraining elements of the second group are completely arranged in the passage channels present between the entraining elements of the first group. Such a configuration of the entraining elements is suitable, for example, for a surface profile in which the entraining elements of the second group, with respect to the second direction of movement of the powder entrainer across the carrier plane, are arranged at the same level as the entraining elements of the first group.

The entraining elements of the first group and the entraining elements of the second group may have a substantially identical basic geometric shape. For example, both the entraining elements of the first group and the entraining elements of the second group can be V-shaped or wedge-shaped. Preferably, however, the entraining elements of the second group are smaller than the entraining elements of the first group.

In a method of operating a powder application device suitable for use in a system for producing a three-dimensional workpiece by means of a generative layering process, a spreading member is moved across a surface of a carrier in order to deposit a raw material powder for producing a workpiece by a generative layering process onto the surface of the carrier. A powder entrainer is moved across a carrier plane, wherein the powder entrainer, in the region of a surface facing the carrier plane, is provided with a surface profile. The surface profile comprises an entraining element and a passage channel. The entraining element and the passage channel are shaped and arranged in such a way that, with respect to the movement of the powder entrainer across the carrier plane, powdery material deposited in front of the powder entrainer on the carrier plane is entrained during a movement of the powder entrainer across the carrier plane in a first direction of movement, and is guided through the passage channel during a movement of the powder entrainer across the carrier plane in a second direction of movement opposite to the first direction of movement.

The powdery material which, with respect to the movement of the powder entrainer across the carrier plane, is deposited on the carrier plane in front of the powder entrainer, during a movement of the powder entrainer across the surface of the carrier in the first direction of movement, is preferably conveyed into a collecting chamber and/or a collecting area located outside a gas flow-critical area. In the collecting chamber, the powdery material can be collected and then processed or disposed of.

A system for producing a three-dimensional workpiece using a generative layering process comprises a powder application device described above.

Preferably, the equipment further comprises a collecting chamber and/or a collecting area located outside a gas flow-critical area, which is adapted to receive powdery material entrained by the powder entrainer during its movement across the carrier plane in the first direction of movement. With respect to the movement of the powder entrainer across the carrier plane in the first direction of movement, the collecting chamber may be arranged behind the carrier.

The system for producing a three-dimensional workpiece may further comprise at least one overflow chamber for receiving excess raw material powder, which is entrained by the spreading member as it moves across the surface of the carrier and is pushed from the surface of the carrier into a region of the carrier plane adjacent to the carrier. Preferably, the system includes two overflow chambers which, with respect to the movement of the spreading member across the surface of the carrier, are located on either side of the carrier. When moving across the surface of the carrier in the first direction of movement, the spreading member can then convey excess raw material powder from the surface of the carrier into a first overflow chamber, which, with respect to the first direction of movement of the spreading member across the surface of the carrier, is arranged behind the carrier. In contrast, when moving across the surface of the carrier in the second direction of movement, the spreading member can convey excess raw material powder from the surface of the carrier into a second overflow chamber which, with respect to the second direction of movement of the spreading member across the surface of the carrier, is located in front of the carrier.

The collecting chamber, in the direction substantially perpendicular to the first and the second direction of movement of the powder entrainer across the carrier plane, may be arranged adjacent to the first overflow chamber. If desired, the collecting chamber and the first overflow chamber may be covered by a common chamber grid. Preferably, however, the collecting chamber is separated from the first overflow chamber by a partition. This allows the powdery material conveyed into the collecting chamber by the powder entrainer to be separated from the excess raw material powder conveyed into the first overflow chamber by the spreading element. The powdery material from the collecting chamber and the excess raw material powder from the first overflow chamber can then be discharged separately from each other from the process chamber. While the uncontaminated excess raw material powder from the first overflow chamber can then be immediately reused, the powdery material from the collecting chamber can either be disposed of or processed for further use.

The invention is explained in more detail below with reference to the accompanying schematic figures, of which FIG. 1 shows a schematic top view of the relevant components of a system for producing a three-dimensional workpiece using a generative layering process, FIG. 2 shows a first variant of a surface profile of a powder entrainer, which is used in a powder application device of the system according to FIG. 1, FIG. 3 shows a second variant of a surface profile of the powder entrainer used in the powder application device of the system according to FIG. 1, and FIG. 4 shows a third variant of an surface profile of the powder entrainer, which is used in the powder application device of the system according to FIG. 1.

FIG. 1 shows a schematic top view of the relevant components of a system 100 for producing a three-dimensional workpiece using a generative layering process. The system 100 comprises a process chamber 102 and an irradiation device arranged above the process chamber 102, which is not shown in FIG. 1. The process chamber 102 is sealed from the ambient atmosphere so that an inert or reaction gas atmosphere or a pressure reduced from atmospheric pressure can be established in the process chamber 102 if required. For this purpose, the process chamber 102 is connected to a gas circuit 104.

Gas may be supplied to the process chamber 102 from a gas source 108 via a gas inlet 106. After flowing through the process chamber 102, the gas is discharged from the process chamber 102 via a gas outlet 110. To convey the gas through the gas circuit 104, a conveying device 112, for example in the form of a blower, is arranged in the gas circuit 104. Gas discharged from the process chamber 102 via the gas outlet 110 may contain particulate impurities, such as powder particles, welding fume particles or condensate particles. Therefore, a gas filter 114 is arranged in the gas circuit 104, through which the gas discharged from the process chamber 102 is passed and freed from particulate impurities before being circulated through the gas inlet 106 into the process chamber 102.

A carrier 116 is disposed in the process chamber 102 for receiving raw material powder and the workpiece produced from the raw material powder by a generative layering process. The carrier 116 is vertically displaceable downward relative to the process chamber 102 into a build chamber not illustrated in FIG. 1. Alternatively, a reverse configuration is possible in which the carrier 116 remains stationary while the remaining components are raised.

A powder application device 10 is movable across the surface of the carrier 116 to apply the raw material powder intended for the manufacture of the workpiece to the surface of the carrier 116 in layers. The powder application device 10 includes a spreading member 12 which, during operation of the powder application device 10, moves in a horizontal direction across the surface of the carrier 116 or a layer of powder already applied to the surface of the carrier 116, thereby applying a new layer of powder. A powder reservoir 14 for receiving the raw material powder to be applied to the carrier 116 is integrated into the spreading member 12 of the powder application device 10 and consequently moves together with the spreading member 12 across the surface of the carrier 116.

The raw material powder applied to the carrier 116 by the powder application device 10 is selectively exposed to the radiation emitted by the irradiation device. The heat input into the raw material powder caused by the irradiation causes melt fusion or sintering of the particles of the raw material powder, whereby the workpiece is built up layer by layer on the carrier 116 from the raw material powder.

The irradiation device comprises a beam source, preferably a laser source, emitting for example light at a wavelength of about 1064 nm. The irradiation device further comprises optical elements, such as a scanning unit, a focusing unit and an F-theta lens. The scanning unit is adapted to scan the beam across the top raw material powder layer within a horizontal plane (in x-direction and y-direction). The focusing unit is adapted to change or adjust a focus position of the beam (in the z-direction).

If desired, the irradiation device may also comprise multiple scanning units and, if necessary, multiple radiation sources.

Further, the powder application device 10 includes a powder entrainer 16. The powder entrainer 16 is attached to the spreading member 12 and, consequently, moves back and forth in the process chamber 102 together with the spreading member 12. However, since the powder entrainer 16 extends from a side surface 18 of the spreading member 12, the powder entrainer 16, unlike the spreading member 12, does not sweep or travel across the carrier 116, but rather across a carrier plane E. In the embodiment of the apparatus 100 shown in FIG. 1, the carrier plane E is defined by a portion of a bottom plate 118 of the process chamber 102 adjacent to the carrier 116.

In the area of a surface 20 facing the carrier plane E, the powder entrainer 16 is provided with a surface profile 22. FIGS. 2 to 4 show different variations of the surface profile 22 formed on the surface 20 of the powder entrainer 16. The surface profile 22 includes a plurality of entraining elements 24a, 24b, 24c and a plurality of passage channels 26a, 26b, 26c arranged between the entraining elements 24a, 24b, 24c. The entraining elements 24a, 24b, 24c and the passage channels 26a, 26b, 26c are shaped and arranged in such a way that, with respect to the movement of the powder entrainer 16 across the carrier plane E, powdery material M deposited in front of the powder entrainer 16 on the carrier plane E is entrained by the entraining elements 24a, 24b, 24c during a movement of the powder entrainer 16 across the carrier plane E in a first direction of movement R1. On the other hand, during a movement of the powder entrainer 16 across the carrier plane E in a second direction of movement R2 opposite to the first direction of movement R1, the powdery material M deposited on the carrier plane E is guided through the passage channels 26a, 26b, 26c.

The paths of movement of the powdery material M relative to the surface profile 22 during a movement of the powder entrainer 16 across the carrier plane E in a first direction of movement R1 are illustrated in FIGS. 2 to 4 by the arrows P1. In contrast, the arrows P2 in FIGS. 2 to 4 illustrate the paths of movement of the powdery material M relative to the surface profile 22 during a movement of the powder entrainer 16 across the carrier plane E in a second direction of movement R2.

Powdery material M, which accumulates in front of the gas outlet 110 on the carrier plane E, can be removed from this area of the carrier plane E using the powder entrainer 16 and pushed across the carrier plane E by the powder entrainer 16 in the first direction of movement R1 of the powder entrainer 16. At the same time, the powder entrainer 16 is prevented from transporting powdery material M deposited on the carrier plane E into the area of the carrier plane E located in front of the gas outlet 110 during a movement across the carrier plane E in the second direction of movement R2. In this way, an undesirable accumulation of powdery material M in the vicinity of the gas outlet 110 can be avoided.

As can best be seen from FIGS. 2 to 4, the entraining elements 24a, 24b, 24c formed on the powder entrainer 16 are tapered in the region of a, with respect to the movement of the powder entrainer 16 across the carrier plane E in the second direction of movement R2, front end. As a result, during a movement of the powder entrainer 16 across the carrier plane E in the second direction of movement R2, the powdery material M can be guided past the entraining elements 24a, 24b, 24c into the passage channels 26a, 26b, 26c present between the entraining elements 24a, 24b, 24c.

In contrast, the entraining elements 24a, 24b, 24c are provided with a powder collecting section 28 in the region of a, with respect to the movement of the powder entrainer 16 across the carrier plane E in the first direction of movement R1, front end. In the case of the entraining elements 24a, 24b, 24c illustrated in FIGS. 2 and 3, the powder collecting section 28 is formed in each case by a cavity bounded by side walls of the entraining elements 24a, 24b, 24c. In contrast, the entraining elements 24a, 24b, 24c shown in FIG. 4 each have a powder collecting section 28 formed by a curved surface which, when the powder entrainer 16 moves across the carrier plane E in the first direction of movement R1, comes into contact with the powdery material M deposited on the carrier plane E and entrains it accordingly.

The entraining elements 24a, 24b, 24c of the surface profile 22 according to FIG. 2 are hook-shaped, while the entraining elements 24a, 24b, 24c of the surface profile 22 according to FIG. 3 are V-shaped. In contrast, the entraining elements 24a, 24b, 24c of the surface profile 22 according to FIG. 4 are wedge-shaped and, as described above, are provided with a powder collecting section 28 defined by a curved surface.

The entraining elements 24a, 24b, 24c are divided into a plurality of groups in all three surface profile variants shown herein. In particular, each of the surface profiles 22 shown in FIGS. 2 to 4 comprises a first group of entraining elements 24*a* arranged in a row next to on another in a direction R3 substantially perpendicular to the first and the second direction of movement R1, R2 of the powder entrainer 16 across the carrier plane E. The direction R3, which is perpendicular to the first and the second direction of movement R1, R2, extends parallel to a longitudinal axis L of the powder entrainer 16. A respective passage channel 26*a* is provided between mutually adjacent entraining elements 24*a* of the first group.

Further, each of the surface profiles 22 includes a second group of entraining elements 24*b* arranged in a row next to on another in the direction R3 substantially perpendicular to the first and the second direction of movement R1, R2. Furthermore, with respect to the first direction of movement R1 of the powder entrainer 16 across the carrier plane E, the entraining elements 24*b* of the second group are arranged behind the first group of entraining elements 24*a*, at least partially in the passage channels 26*a* present between the entraining elements 24*a* of the first group.

In the surface profile variant 22 shown in FIG. 2, only a portion of the entraining elements 24*b* of the second group protrudes into the passage channels 26*a* provided between the entraining elements 24*a* of the first group. In contrast, in the surface profile variants shown in FIGS. 3 and 4, the entraining elements 24*b* of the second group are each completely received in the passage channels 26*a* present between the entraining elements 24*a* of the first group.

However, in all the surface profile variants shown in FIGS. 2 to 4, the entraining elements 24*b* of the second group are shaped and arranged in such a way that, when the powder entrainer 16 moves across the carrier plane E in the first direction of movement R1, they capture and entrain powdery material M entering the passage channels 26*a* between the entraining elements 24*a* of the first group, see arrows P1 in FIGS. 2 to 4. Consequently, when the powder entrainer 16 moves across the carrier plane E in the first direction of movement R1, the entraining elements 24*a* of the first group first encounter the powdery material M deposited on the carrier plane E. A part of the powdery material M is then already captured and entrained by the entraining elements 24*a* of the first group, i.e. in particular their powder collecting sections 28. On the other hand, powdery material M which initially enters the passage channels 26*a* between the entraining elements 24*a* of the first group encounters the entraining elements 24*b* of the second group in the further course of the movement of the powder entrainer 16 across the carrier plane E in the first direction of movement R1, and is captured and entrained by these, i.e. in particular their powder collecting sections 28.

Further, the entraining elements 24*b* of the second group are shaped and arranged to guide powdery material M entering the passageways 26*a* during a movement of the powder entrainer 16 across the carrier plane E in the second direction of movement R2 though the passageways 26*a*, i.e. to allow the powdery material M to pass through the passageways 26*a*, see arrows P2 in FIGS. 2 to 4.

In the surface profile 22 shown in FIG. 2, the entraining elements 24*a* of the first group, with respect to the second direction of movement R2 of the powder entrainer 16 across the carrier plane E, are arranged behind the entraining elements 24*b* of the second group. Consequently, during a movement of the powder entrainer 16 across the carrier plane E in the second direction of movement R2, first the entraining elements 24*b* of the second group and only then the entraining elements 24*a* of the first group encounter the material M deposited on the carrier plane E. In contrast, the surface profiles 22 shown in FIGS. 3 and 4 are designed in such a way that the entraining elements 24*b* of the second group, with respect to the second direction of movement R2 of the powder entrainer 16 across the carrier plane, are arranged at the same level as the entraining elements 24*a* of the first group E. In this case, when the powder entrainer 16 moves across the carrier plane E in the second direction of movement R2, the entraining elements 24*a*, 24*b* of the first and the second group simultaneously encounter the powdery material M deposited on the carrier plane E, so that the powdery material is guided past the entraining elements 24*b* of the second group through the passage channels 26*a* provided between the entraining elements 24*a* of the first group.

In the surface profile 22 shown in FIG. 2, the entraining elements 24*b* of the second group, in the direction R3 substantially perpendicular to the first and the second direction of movement R1, R2 of the powder entrainer 16 across the carrier plane E, are further arranged offset relative to the entraining elements 24*a* of the first group, whereby an entraining element 24*b* of the second group projects into each passage channel 26*a* present between two entraining elements 24*a* of the first group. Furthermore, the surface profile 22 shown in FIG. 2 comprises a third group of entraining elements 24*c*. The entraining elements 24*c* of the third group are arranged in a row next to one another in the direction R3 substantially perpendicular to the first and the second direction of movement R1, R2 of the powder entrainer 16 across the carrier plane E, and offset relative to the entraining elements 24a, 24b of the first and second groups.

With respect to the first direction of movement R1 of the powder entrainer 16 across the carrier plane E, the entraining elements 24c of the third group are arranged behind the second group 24b of entraining elements and each project into passage channels 26b present between the entraining elements 24b of the second group. Finally, the surface profile 22 shown in FIG. 2 includes passage channels 26c each disposed between two mutually adjacent entraining elements 24c of the third group. Each passage channel 26a is connected to a passage channel 26b, and each passage channel 26b is in turn connected to a passage channel 26c, so that material M deposited on the carrier plane E can pass successively through the passage channels 26c, 26b, 26a during a movement of the powder entrainer 16 across the carrier plane E in the second direction of movement R2, see arrows P2 in FIG. 2.

In the surface profile 22 shown in FIG. 2, the entraining elements 24a of the first group, the entraining elements 24b of the second group and the entraining elements 24c of the third group are identically shaped. In contrast, the entraining elements 24a of the first group and the entraining elements 24b of the second group in the surface profiles 22 according to FIGS. 3 and 4 merely have an identical basic geometric shape, but are of different sizes. In particular, the entraining elements 24b of the second group are smaller than the entraining elements 24b of the first group.

During operation of the system 100, the powder material M entrained by the powder entrainer 16 during a movement across the carrier plane E in the first direction of movement R1 is conveyed by the powder entrainer 16 into a collecting chamber 120 which, with respect to the movement of the powder entrainer 16 across the carrier plane E in the first direction of movement R1, is arranged behind the carrier 116 and, in the direction R3 substantially perpendicular to the first and the second direction of movement R1, R2 of the powder entrainer 16 across the carrier plane E, offset relative to the carrier 116. Accordingly, the collecting chamber 120 is sufficiently distant from the gas outlet 110 of the process chamber 102.

The collecting chamber 120 is disposed adjacent to a first overflow chamber 122. The first overflow chamber 122 is for receiving excess raw material powder carried away from the surface of the carrier 116 by the spreading member 12 during movement across the surface of the carrier 116 in the first direction of movement R1. Further, a second overflow chamber 124 is provided for receiving excess raw material powder transported away from the surface of the carrier 116 by the spreading member 12 during movement across the surface of the carrier 116 in the second direction of movement R2.

The collecting chamber 120 and the first overflow chamber 122 are covered by a common chamber grid 126. However, the collecting chamber 120 is separated from the first overflow chamber 122 by a partition 128. This allows the powdery material M conveyed into the collecting chamber 120 by the powder entrainer 16 to be separated from the excess raw material powder conveyed into the first overflow chamber 122 by the spreading member 12, and discharged separately therefrom from the process chamber 102. The uncontaminated excess raw material powder from the first overflow chamber 122 can then be immediately reused. In contrast, the powdery material M from the collecting chamber 120 can either be disposed of or processed for further use.

The invention claimed is:

1. A powder application device for use in a system for producing a three dimensional workpiece using a generative layering process, the powder application device comprising:
a spreading member movable across a surface of a carrier for depositing a raw material powder for producing a workpiece by a generative layering method onto the surface of the carrier, and
a powder entrainer which is movable across a carrier plane and which, in the region of a surface facing the carrier plane, is provided with a surface profile comprising a plurality of entraining elements and a plurality of passage channels arranged between the entraining elements, the plurality of entraining elements and the plurality of passage channels being shaped and arranged in such a way that, with respect to the movement of the powder entrainer across the carrier plane, powdery material deposited in front of the powder entrainer on the carrier plane is entrained by the plurality of entraining elements during a movement of the powder entrainer across the carrier plane in a first direction of movement, and is guided through the plurality of passage channels during a movement of the powder entrainer across the carrier plane in a second direction of movement opposite to the first direction of movement,
wherein at least a part of the plurality of entraining elements is designed to be tapered in the region of a, with respect to the movement of the powder entrainer across the carrier plane in the second direction of movement, front end.

2. The powder application device according to claim 1, wherein the powder entrainer is fixed to the spreading member and extends in a direction substantially perpendicular to the first and the second direction of movement of the powder entrainer across the carrier plane from a side surface of the spreading member.

3. The powder application device according to claim 1, wherein
at least a part of the plurality of entraining elements is provided with a powder collecting section in the region of a, with respect to the movement of the powder entrainer across the carrier plane in the first direction of movement, front end.

4. The powder application device according to claim 1, wherein at least a part of the plurality of entraining elements is V-shaped, wedge-shaped and/or hook-shaped.

5. The powder application device according to claim 1, wherein the plurality of entraining elements comprises a first group of entraining elements, which are arranged in a row next to one another in the direction substantially perpendicular to the first and the second direction of movement of the powder entrainer across the carrier plane, wherein a respective passage channel is present between mutually adjacent entraining elements of the first group.

6. The powder application device according to claim 5, wherein the plurality of entraining elements comprises a second group of entraining elements which are arranged in a row next to one another in the direction substantially perpendicular to the first and the second direction of movement of the powder entrainer across the carrier plane and, with respect to the first direction of movement of the powder entrainer across the carrier plane, behind the first group of entraining elements and at least partially in the passage channels present between the entraining elements of the first group.

7. The powder application device according to claim 6, wherein the entraining elements of the second group are shaped and arranged in such a way that they capture and entrain powdery material entering the passageways between the entraining elements of the first group during movement of the powder entrainer across the carrier plane in the first direction of movement.

8. The powder application device according to claim 6, wherein the entraining elements of the second group are shaped and arranged to direct powdery material entering the passageways upon movement of the powder entrainer across the carrier plane in the second direction of movement through the passageways.

9. The powder application device according to claim 6, wherein the entraining elements of the second group, in the direction substantially perpendicular to the first and the second direction of movement of the powder entrainer across the carrier plane, are arranged offset to the entraining elements of the first group, the plurality of entraining elements comprises a third group of entraining elements which are arranged in a row next to one another in the direction substantially perpendicular to the first and the second direction of movement of the powder entrainer across the carrier plane and/or offset relative to the entraining elements of the first and/or of the second group, and/or which, with respect to the first direction of movement of the powder entrainer across the carrier plane, are arranged behind the second group of entraining elements at least partially in passage channels present between the entraining elements of the second group, and/or the entraining elements of the first group, the entraining elements of the second group and/or the entraining elements of the third group are substantially identically shaped.

10. The powder application device according to claim 6, wherein the entraining elements of the second group are completely arranged in the passage channels present between the entraining elements of the first group and/or the entraining elements of the first group and the entraining elements of the second group have a substantially identical basic geometric shape and/or the entraining elements of the second group are smaller than the entraining elements of the first group.

11. A method of operating a powder application device suitable for use in a system for producing a three-dimensional workpiece using a generative layering process, the method comprising the steps of:

moving a spreading member across a surface of a carrier to deposit a raw material powder for producing a workpiece by a generative layering method onto the surface of the carrier, and moving a powder entrainer across a carrier plane, wherein the powder entrainer, in the region of a surface facing the carrier plane, is provided with a surface profile comprising a plurality of entraining elements and a plurality of passage channels arranged between the entraining elements, the plurality of entraining elements and the plurality of passage channels being shaped and arranged in such a way that, with respect to the movement of the powder entrainer across the carrier plane, powdery material deposited in front of the powder entrainer on the carrier plane is entrained by the plurality of entraining elements during a movement of the powder entrainer across the carrier plane in a first direction of movement, and is guided through the plurality of passage channels during a movement of the powder entrainer across the carrier plane in a second direction of movement opposite to the first direction of movement, wherein at least a part of the plurality of entraining elements is designed to be tapered in the region of a, with respect to the movement of the powder entrainer across the carrier plane in the second direction of movement, front end.

12. The method according to claim 11, wherein the powdery material which, with respect to the movement of the powder entrainer across the carrier plane, is deposited on the carrier plane in front of the powder entrainer, during a movement of the powder entrainer across the surface of the carrier in the first direction of movement, is conveyed into a collecting chamber and/or a collecting area located outside a gas flow-critical area.

13. A system for producing a three-dimensional workpiece using a generative layering process, which comprises a powder application device according to claim 1.

14. The system according to claim 13, further comprising a collecting chamber and/or a collecting area located outside a gas flow critical area, which is adapted to receive powdery material entrained by the powder entrainer during its movement across the carrier plane in the first direction of movement.

15. The system according to claim 14, wherein the collecting chamber with respect to the movement of the powder entrainer across the carrier plane in the first direction of movement is arranged behind the carrier and/or in the direction substantially perpendicular to the first and the second direction of movement of the powder entrainer across the carrier plane is arranged relative to the carrier.

* * * * *